J. O. SCHLOTTERBECK.
GRAPE POMACE HEATER.
APPLICATION FILED DEC. 6, 1913.
1,134,913.
Patented Apr. 6, 1915.
3 SHEETS—SHEET 3.
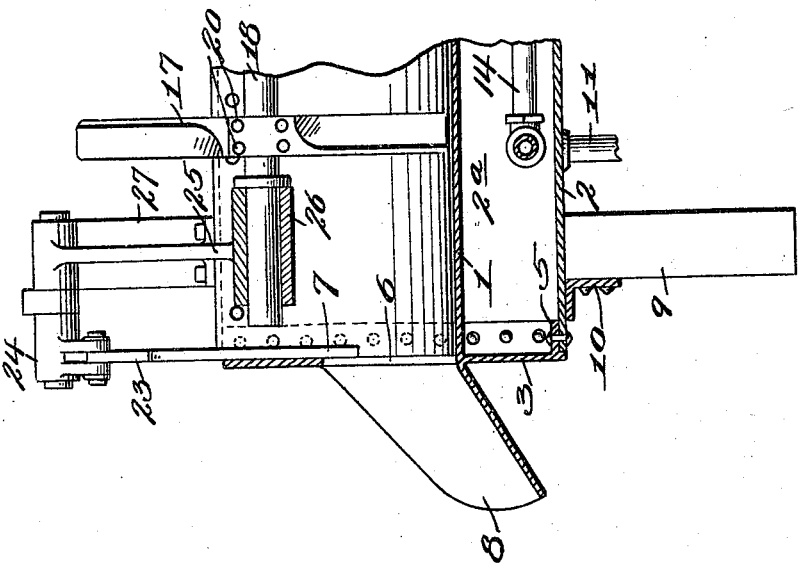
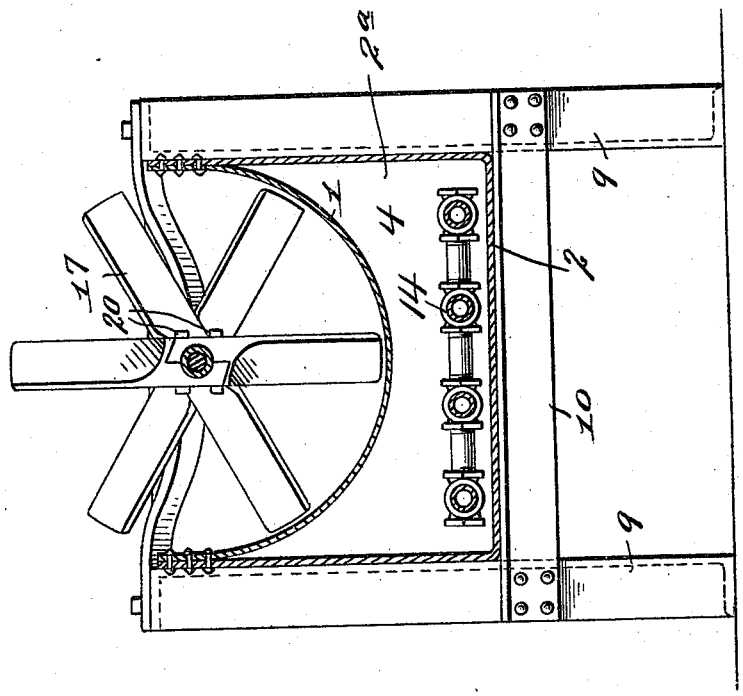
Witnesses
Inventor
Julius O. Schlotterbeck
By
Attorney

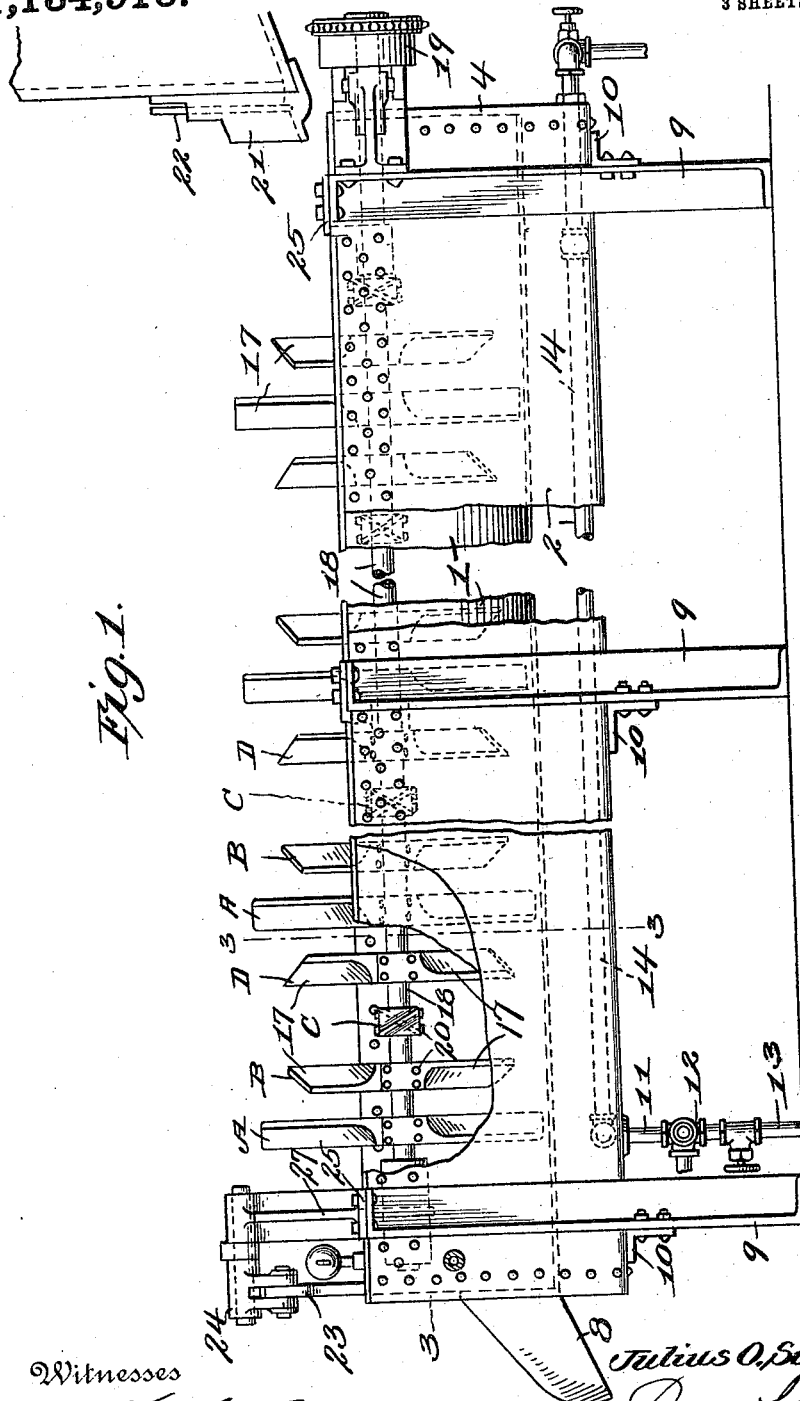

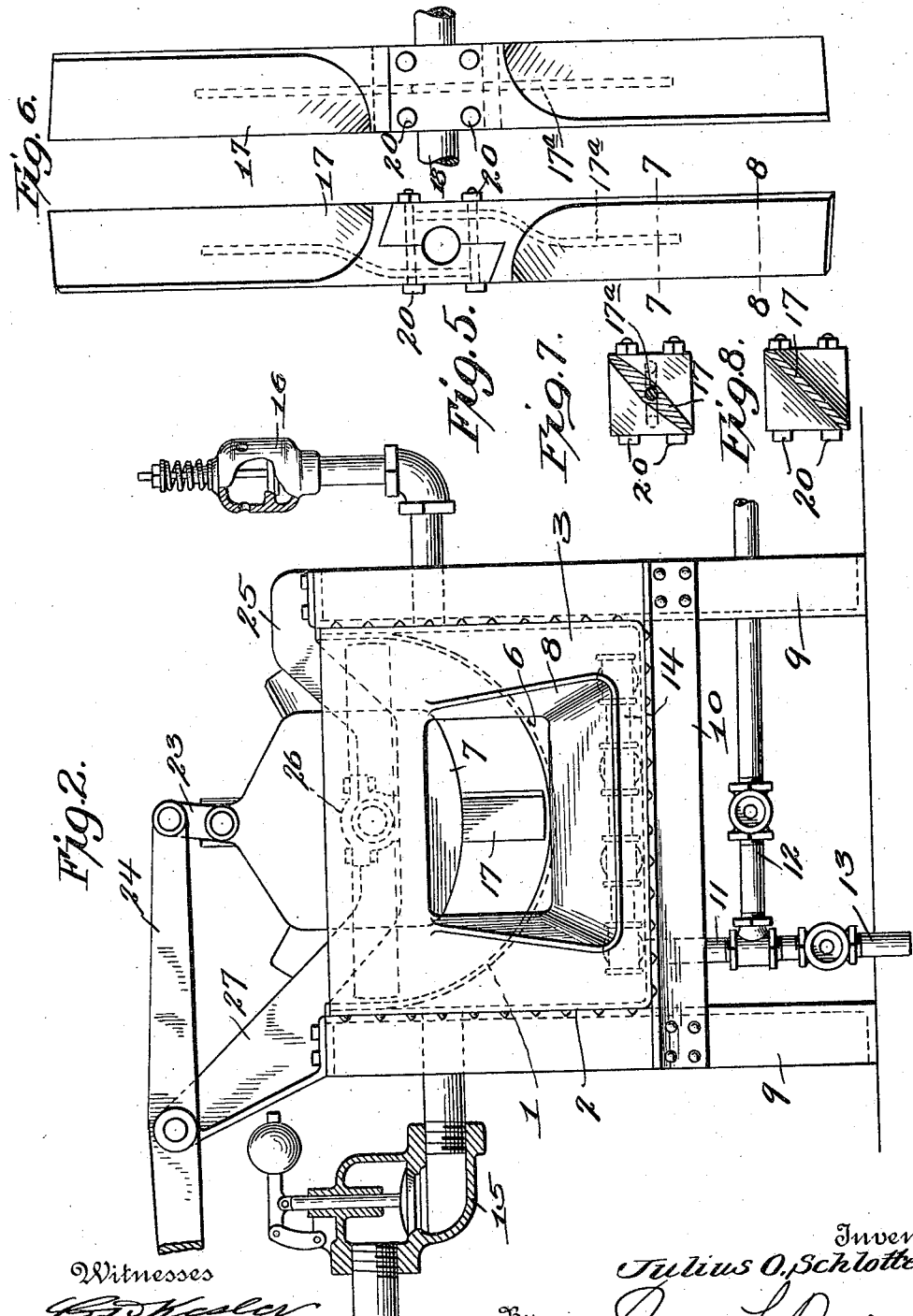

UNITED STATES PATENT OFFICE.

JULIUS O. SCHLOTTERBECK, OF ROCHESTER, NEW YORK, ASSIGNOR TO J. HUNGERFORD SMITH GRAPE JUICE COMPANY, OF LAWTON, MICHIGAN, A CORPORATION OF MICHIGAN.

GRAPE-POMACE HEATER.

1,134,913.      Specification of Letters Patent.      Patented Apr. 6, 1915.

Application filed December 6, 1913. Serial No. 805,068.

*To all whom it may concern:*

Be it known that I, JULIUS O. SCHLOTTERBECK, a citizen of the United States, residing at Rochester, in the county of Monroe and State of New York, have invented new and useful Improvements in Grape-Pomace Heaters, of which the following is a specification.

This invention relates to improvements in apparatus for heating grape pomace in the course of the preparation of bottled grape juice. The pomace heating operation is employed to develop the requisite flavor and color and its success is measured by the thoroughness and uniformity of the action of the heat upon the pomace.

The principal object of the present invention is, therefore, to provide a grape pomace heater by means of which the pomace is thoroughly and uniformly subjected to the action of the heat for a suitable period of time and in furtherance of this object the invention in its preferred embodiment proposes a novel arrangement of agitating blades which retards the flow of the pomace through the heating tank and causes the pomace in said tank to surge horizontally, first in one direction, then in the other and at the same time causing a rotary agitation of the pomace. By virtue of these operative characteristics of the agitating blades it is possible to accurately regulate the time element of the heating operation without regard to the speed of rotation of said blades and the pomace is thoroughly and uniformly subjected, throughout its mass, to the action of the heat. It is important that all the exposed parts of the heater should be kept in a clean condition in order to prevent any contamination of the product.

A further object of the invention is to provide a pomace heater in which the parts are readily accessible for the purpose of cleaning and with this object in view the invention proposes a novel organization of the pomace tank, the agitating blades, and the shaft upon which said blades are mounted whereby the shaft and the blades may be quickly removed as an entirety from the tank and may in like manner be as readily otherwise affecting the organization of the tank and may in like manner be as readily and quickly replaced. The shaft and the blades when removed from the tank in the manner stated may be thoroughly and quickly cleaned as a unit and the tank itself, devoid of the shaft and the blades, may be cleaned with equal thoroughness and rapidity.

Other objects and advantages will appear as the description proceeds.

An embodiment of the invention is illustrated in the accompanying drawings, wherein:

Figure 1 is a side elevation of a grape pomace heater in which the features of the invention are incorporated, the tank being partly broken away to more fully expose to view the arrangement of the agitating blades. Fig. 2 is a front end elevation of the heater, the pressure and vacuum relief valves which are employed as adjuncts of the heating system being shown in section. Fig. 3 is a cross-sectional view of the heater on the line 3—3 of Fig. 1. Fig. 4 is a detail longitudinal sectional view of the discharge end of the heater. Fig. 5 is an end elevation of a pair of opposed agitating blades; Fig. 6 is a side elevation of the same; and Figs. 7 and 8 are detail sectional views on the lines 7—7 and 8—8 of Fig. 5.

Similar characters of reference designate corresponding parts throughout the several views.

The pomace is heated in a container which includes a trough 1, preferably of aluminum and semi-circular in cross section and an outer shell 2. The trough 1 is arranged within the shell 2, which is preferably of boiler plate and is proportioned to provide a heating jacket $2^a$ of suitable dimensions which extends throughout the length and breadth of the trough 1. The trough 1 and the jacket $2^a$ are closed at their ends by end plates 3 and 4 which are preferably of aluminum. The plates 3 and 4 are preferably secured to the trough 1 by welding and are provided with marginal flanges 5 which are secured to the shell 2 by rivets or other suitable means. The end plate 4 is solid, but the end plate 3 is provided with a suitable pomace discharge opening 6, controlled by a sliding gate 7 and with a discharge spout 8 leading from the opening 6.

The support for the heater comprises a suitable number of frames composed of uprights 9 and cross bars 10 which are preferably of angle iron construction, the cross bars being arranged at a suitable distance above the lower ends of the uprights 9 and the shell 2 resting directly on said cross bar.

The jacket 2ª is filled to a suitable elevation with water and is provided with a pipe 11 to which is joined a valve-controlled water inlet pipe 12 and a valve-controlled drain pipe 13. The water in the jacket 2ª is heated by a suitable arrangement of steam coils 14. Said jacket is also provided with suitably constructed pressure and vacuum relief valves 15 and 16, respectively.

The pomace in the trough 1 is kept in a state of constant agitation by means of blades 17 which are arranged on a rotating shaft 18. The shaft 18 is arranged centrally of the trough 1 in the extreme upper portion thereof, i. e. above the normal level of the pomace and extends throughout the length of the trough. The shaft 18 projects beyond the receiving end of the trough, the end plate 4 being suitably recessed for this purpose, and on its projecting end carries a suitable clutch 19 by means of which its rotation may be controlled. The blades 17 project nearly to the face of the trough 1 and are preferably arranged in double spiral relation, the blades of each pair being formed at their inner ends to fit over the shaft 18 and having their inner end portions connected by bolt fastenings 20.

The essential characteristic of the blades 17, whether they be disposed in double spiral relation or otherwise is their arrangement whereby they simultaneously agitate the pomace and retard its flow to the discharge end of the trough. To achieve these operations the blades are preferably so arranged as to cause the pomace to surge horizontally, first in one direction and then in the other, and, at the same time, to interpose in the path of the pomace, as it flows through the trough, areas, substantially large in the aggregate, which oppose or resist, and thereby retard, the flow of the pomace toward the discharge end of the trough. In the embodiment disclosed the blades are arranged in angular planes, facing alternately in opposite directions along the length of the shaft 18, and those blades which have the same disposition on the shaft face in the same direction. In this way the pomace is agitated first by a group of blades all facing in one direction and then by a group of blades all facing in a direction opposite to the blades of the first group, and so on throughout each revolution of the shaft 18. Thus the blades may be so arranged that during each revolution of the shaft 18 four groups of blades will agitate the pomace in which case the shaft will carry any desired number of series of blades, the blades of a series being distinguished by the letters A, B, C and D. One group of agitating blades will comprise the blades A, a second group the blades B, a third group the blades C, and a fourth group the blades D. The number of groups of blades will thus be the same as the number of blades forming each series and the number of blades in each group will be the same as the number of series of such blades. Thus, if there are six series of spirally arranged blades, each series consisting of four blades, there will be four groups of blades, each group consisting of six blades. The blades of the respective groups all have the same disposition on the shaft 18 and all face in the same direction, but the blades of each group face oppositely to the blades of the adjoining group. Thus, the blades A which form one group are arranged on a straight line taken longitudinally of the shaft 18 and face in the same direction; the blades of each of the other groups are similarly arranged on other straight lines taken longitudinally of the shaft 18; and the blades A and C face in the same direction while the blades B and D which alternate with the blades A and C, face in opposite directions to said blades A and C.

The blades A and C tend to drive the pomace, for example, toward the discharge end of the trough and the blades B and D tend to drive the pomace to the receiving end of the trough. In this way the pomace is caused to contantly surge horizontally to and fro lengthwise of the trough simultaneously with its rotary agitation by the blades, and it follows that the agitation of the pomace is thorough and uniform throughout the mass. The areas of the blades which, at any period of the operation, are agitating the pomace, are sufficiently great, in the aggregate, to sensibly oppose, and thereby retard, the flow of the pomace toward the discharge end of the trough. Inasmuch as the arrangement of the blades whereby they face alternately in opposite directions counteracts any tendency incident to any ordinary spiral arrangement of the blades to feed the pomace toward the discharge end of the trough, the uniformity of the cooking of the pomace is promoted and the time element of the operation may be regulated accurately and as may be desired without regard to the speed of rotation of the blade shaft 18.

The tank or vat which contains the pomace to be treated has an outlet 21 which is arranged above the receiving end of the trough and is provided with a suitable sliding gate 22 by means of which the admission of pomace to the trough may be controlled. The discharge of pomace from the trough is controlled by the gate 7 which is suspended by a link 23 from an operating lever 24.

The support for the shaft 18 comprises cross bars 25, preferably of aluminum, and provided with bearings 26 in which the shaft 18 is journaled, which bearings have removable cap pieces that permit the removal of the shaft from said cross bars. The cross bars 25 are supported upon and secured to the uprights 9, each cross bar thus connecting and bracing a pair of said uprights and being similar in this respect to the cross bars 10. The cross bar 25 adjacent the discharge end of the trough 1 may conveniently be provided with a bracket 27 to which the operating lever 24 for the gate 7 is pivoted.

By merely removing the cap pieces of the bearings 26, the shaft 18 with the blades 17 may be lifted from the cross bars 25 and removed as a unit from the trough 1. When so removed the shaft and the blades may be easily, thoroughly, and quickly cleaned and during the period in which the shaft 18 is removed the trough 1 may also be cleaned with equal ease, thoroughness, and rapidity, since its inner surface is wholly exposed and accessible. The shaft 18 is preferably composed of aluminum cast about a steel core and the blades 17 are of similar construction, the steel core 17$^a$ thereof being shown in Fig. 6.

Having fully described my invention, I claim:

1. In a grape pomace heater, a pomace trough, a shaft extending lengthwise of the trough and a plurality of pomace agitating blades so arranged on the shaft as to cause a constant horizontal surging of the pomace to and fro lengthwise of the trough simultaneously with their rotary agitating action.

2. In a grape pomace heater, a pomace trough, a shaft extending lengthwise of the trough, and a plurality of pomace agitating blades projecting radially from the shaft, the blades facing alternately in opposite directions whereby to cause a constant horizontal surging of the pomace to and fro lengthwise of the trough.

3. In a grape pomace heater, a pomace trough, a shaft extending legthwise of the trough, a plurality of pomace agitating blades projecting radially from the shaft and arranged in spiral formation, the blades facing alternately in opposite directions and the blades on any given straight line taken horizontally of the shaft facing in the same direction whereby to cause a constant horizontal surging of the pomace to and fro lengthwise of the trough.

4. In a grape pomace heater, a pomace trough, a shaft extending lengthwise of the trough, a plurality of cross bars bridging the trough and having bearings for said shaft, said bearings having removable cap pieces to provide for the removal of said shaft from said cross bars, and a plurality of pomace agitating blades arranged on said shaft.

5. In a grape pomace container including a pomace heater, a pomace trough, a shaft extending lengthwise of the trough, uprights arranged in pairs at the sides of the container, cross bars connecting the uprights of each pair and forming direct supports for the container, other cross bars bridging the trough and connecting the uprights at their upper ends, said last named cross bars having bearings for said shaft, and a plurality of pomace agitating blades arranged on said shaft.

6. In a grape pomace heater, a pomace container including a pomace trough, a shaft extending lengthwise of the trough, uprights arranged in pairs at the sides of the container, cross bars connecting the uprights of each pair and forming direct supports for the container, other cross bars bridging the trough and connecting the uprights at their upper ends, said last named cross bars having bearings for said shaft, said bearings having removable cap pieces to provide for the removal of said shaft, and a plurality of pomace agitating blades arranged on said shaft.

7. In a grape pomace heater, a pomace trough having end plates, one of which is provided with a discharge opening, a sliding gate arranged to control said discharge opening, a shaft extending lengthwise of said trough, and pomace agitating blades arranged on said shaft in such manner as to retard the movement of the pomace toward the discharge end of the trough.

8. In a grape pomace heater, a pomace trough having a semi-circular cross section, an outer shell providing a heating jacket for said trough, the shell having its edge portions secured to the edge portions of the trough, plates closing the ends of said trough and said heating jacket, supporting means comprising uprights arranged at opposite sides of the shell in pairs and a cross bar connecting the uprights of each pair, the shell resting on said cross bars, and pomace agitating means working within the trough.

9. In a grape pomace heater, a pomace trough having a semi-circular cross section, an outer shell providing a heating jacket for said trough, the shell having its edge portions secured to the edge portions of the trough, plates closing the ends of said trough and said heating jacket, supporting means comprising uprights arranged at opposite sides of the shell in pairs and a cross bar connecting the uprights of each pair, the shell resting on said cross bars, a shaft extending lengthwise of the trough, pomace agitating blades arranged on said shaft, other cross bars bridging said trough and connecting said uprights at their upper ends, and bearings for said shaft provided on said last-named cross bars.

10. In a grape pomace heater, a pomace trough having end plates, one of the end plates having a pomace discharge opening, a sliding gate controlling said discharge opening, a shaft extending lengthwise of the trough and a plurality of pomace agitating blades so arranged on the shaft as to cause a constant horizontal surging of the pomace to and fro lengthwise of the trough simultaneously with their rotary agitating action.

11. In a grape pomace heater, a pomace trough having a discharge end which is open during the normal operation of the heater, a shaft extending lengthwise of said trough, and blades arranged on said shaft in such manner as to thoroughly agitate the pomace and to simultaneously and sensibly retard its flow toward the discharge end of the trough.

12. In a grape pomace heater, a pomace trough having a discharge end which is open during the normal operation of the heater, a shaft extending lengthwise of said trough and a plurality of pomace agitating blades so arranged on the shaft as to cause a constant horizontal surging of the pomace to and fro lengthwise of the trough simultaneously with their rotary agitating action.

13. In a grape pomace heater, a pomace trough having a discharge end which is open during the normal operation of the heater and means operating throughout the extent of the trough for agitating the pomace and simultaneously and sensibly retarding its movement toward the open discharge end of the trough.

14. In a grape pomace heater, a pomace trough having a pomace discharge opening at one end thereof, and pomace agitating means working throughout the length of the trough and operable to cause a horizontal surging of the pomace to and fro lengthwise of the trough simultaneously with its agitating action.

15. In a grape pomace heater, a pomace trough having a pomace discharge opening at one end thereof, pomace agitating means working throughout the length of the trough and operable to cause a horizontal surging of the pomace to and fro lengthwise of the trough simultaneously with its agitating action, and a regulating closure for said discharge opening.

16. In a grape pomace heater, a pomace trough having a discharge end which is open during the normal operation of the heater, a shaft extending lengthwise of said trough, blades arranged on said shaft in such manner as to thoroughly agitate the pomace and to simultaneously and sensibly retard its flow toward the discharge end of the trough and a regulating closure for said discharge end.

17. In a grape pomace heater, a pomace trough having a discharge end which is open during the normal operation of the heater, means operating throughout the extent of the trough for agitating the pomace and simultaneously and sensibly retarding its movement toward the open discharge end of the trough and a regulating closure for said discharge end.

18. In a grape pomace heater, a pomace trough having an outlet toward which the pomace has a gravitating flow and means for agitating the pomace and simultaneously and sensibly retarding its movement toward said outlet.

19. In a grape pomace heater, a pomace trough having an outlet and pomace agitating means operable to cause the pomace to surge, continuously during its movement toward the outlet, first in one direction and then in the other.

In testimony whereof I have hereunto set my hand in presence of two subscribing witnesses.

JULIUS O. SCHLOTTERBECK.

Witnesses:
I. CHAS. HASKIN,
J. R. DEAN.

Copies of this patent may be obtained for five cents each, by addressing the "Commissioner of Patents, Washington, D. C."

It is hereby certified that in Letters Patent No. 1,134,913, granted April 6, 1915, upon the application of Julius O. Schlotterbeck, of Rochester, New York, for an improvement in "Grape-Pomace Heaters," an error appears in the printed specification requiring correction as follows: Page 1, line 51, strike out the words "and may in like manner be as readily" and insert the words *without in any way disturbing or;* and that the said Letters Patent should be read with this correction therein that the same may conform to the record of the case in the Patent Office.

Signed and sealed this 11th day of May, A. D., 1915.

[SEAL.]
R. F. WHITEHEAD,
*Acting Commissioner of Patents.*